United States Patent [19]

Fuchs et al.

[11] Patent Number: 5,359,199
[45] Date of Patent: Oct. 25, 1994

[54] SPECIFIC MODIFICATION OF THE SURFACES OF SOLIDS IN THE NANOMETER RANGE BY LOCAL DELAMINATION, AND THE STORAGE OF INFORMATION UNITS

[75] Inventors: Harald Fuchs, Carlsberg; Thomas Schimmel, Hof, both of Fed. Rep. of Germany

[73] Assignee: BASF Aktiengesellschaft, Ludwigshafen, Fed. Rep. of Germany

[21] Appl. No.: 924,487

[22] Filed: Aug. 4, 1992

[30] Foreign Application Priority Data

Aug. 10, 1991 [DE] Fed. Rep. of Germany ....... 4126497

[51] Int. Cl.$^5$ ............................................... H01J 37/30
[52] U.S. Cl. .............................. 252/492.3; 250/307; 369/101
[58] Field of Search .................. 250/306, 307, 492.3, 250/492.2; 369/101

[56] References Cited

U.S. PATENT DOCUMENTS

| | | | |
|---|---|---|---|
| 4,987,312 | 1/1991 | Eigler | 369/101 |
| 5,144,148 | 9/1992 | Eigler | 250/492.3 |
| 5,216,631 | 6/1993 | Sliwa | 365/174 |

FOREIGN PATENT DOCUMENTS 0186911 7/1986 European Pat. Off. .
0486456 1/1992 European Pat. Off. .

OTHER PUBLICATIONS

R. J. Behm et al., "Scanning Tunneling . . . ", 1990, pp. 113–141.
J. Vacuum Science & Tech., Burnham et al., 1989, vol. 7, No. 4.
Phys. Revw. Letters, Soler et al., vol. 57, No. 4, 1986.
Phys. Revw. Letters, Coleman et al., vol. 55, No. 4, 1985.
J. Vacuum Science & Tech., Gauthier et al., vol. 6, No. 2, 1988.
Direct writing in Si with a scanning tunneling microscope, van Loenen et al. Appl. Phys. Lett. 56(13), 25 Sep. 1989.

*Primary Examiner*—Bruce C. Anderson
*Attorney, Agent, or Firm*—Keil & Weinkauf

[57] ABSTRACT

A process for the specific, location-selective and time-stable modification of surfaces of solids in the nanometer range without destruction of the atomic order of the surface at the location of the structure or in the vicinity thereof, where a local delamination is caused at the surface of solids having a layered structure due to the action of a local probe. This process is used for the storage of information.

10 Claims, 2 Drawing Sheets

FIG.I(A)
FIG.I(B)
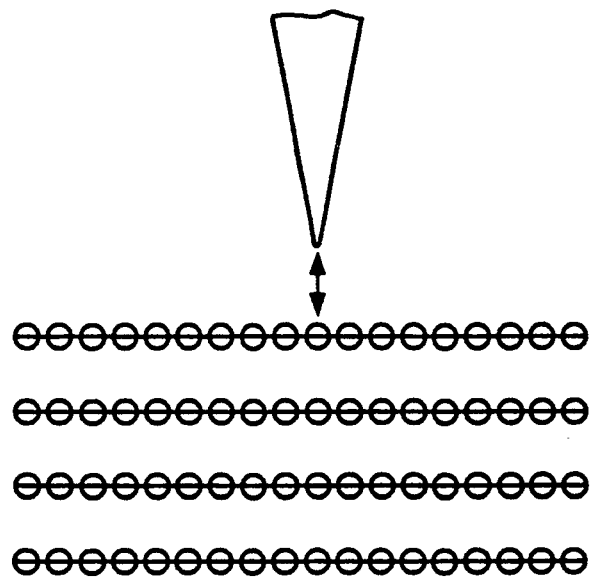
FIG.I(C)
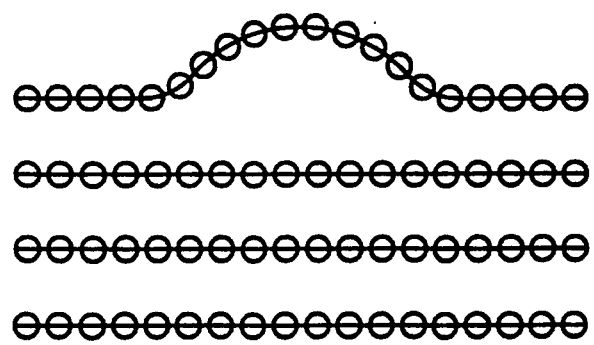

SPECIFIC MODIFICATION OF THE SURFACES OF SOLIDS IN THE NANOMETER RANGE BY LOCAL DELAMINATION, AND THE STORAGE OF INFORMATION UNITS

The present invention relates to a process for the specific, location-selective and time-stable modification of the surfaces of solids in the nanometer range without destruction of the atomic order of the surface at the location of the structure or in its vicinity, and to the use of the process for the storage of information.

BACKGROUND OF THE INVENTION

1. Field of the Invention

The generation of ever smaller structures which can be read out again in a reproducible manner is of considerable interest, in particular when used for data storage. The storage density of such media is determined by the smallest structure which can be written and read reproducibly. The achievable dimensions of the generated structures are limited at the lower end in two respects. Firstly, the positional accuracy and the local resolution limits the achievable storage density for example due to the geometry of the read/write head. Secondly, however, material properties, for example material inhomogeneities or the size of the Weiß domains, do not allow the size of generated structures to be reduced as desired. The lower limit for writing smaller and smaller information units into a solid is set in principle by the distance between adjacent atoms. An object which is desirable for high storage densities is to come very close to this fundamental limit, i.e. to be able to store the 1 bit information unit on a dimension of only a few atomic diameters.

2. Description of the Related Art

Near field methods using local probes, for example the scanning tunneling microscope (STM) or the scanning force microscope in the form of an atomic force microscope or magnetic force microscope, are the obvious choice for such storage processes, not only due to their high positional accuracy of better than 0.1 nm but in particular also due to their high local resolution. Thus, it has already proved possible to "write" letters on nickel using xenon atoms at 4K and in an ultra-high vacuum by specifically positioning xenon atoms using the tip of an STM (D. M. Eigler and E. K. Schweitzer, Nature 344 (1990) 524).

However, the possibility of writing and reading under ambient conditions, i.e. at room temperature and in air, is also crucial for the industrial application of extremely small structures of this type in addition to their dimensions and the reproducibility of the writing process. The structures produced should also prove to be time-stable under these conditions.

The production of structures of this type which are time-stable at room temperature is possible, for example, by mechanically inserting the tip into the sample (van Loenen et al., Appl. Phys. Lett. 55 (1989) 1312). At the same time, however, the surface of the sample is in most cases destroyed locally due to bond breaking. This in turn has the disadvantage that the process is no longer reversible and thus subsequent erasure or modification of the information is no longer possible once it has been written. Rather, it is desired to have a process which allows small deformations having dimensions in the nanometer range to be produced on the surface of a solid without destruction of the atomic order of the surface, since modifications of this type include the potential for erasability, for example by thermal means.

SUMMARY OF THE INVENTION

It is an object of the present invention to provide a process which allows the specific and reproducible production of time-stable elevations having dimensions in the nanometer range on the surface of a solid under ambient conditions, i.e. in air and at room temperature, without the modification process locally destroying the imaged atomic order of the surface, for example due to bond breaking, at the location of the modification or in the immediate vicinity thereof.

We have found that this object is achieved by a process for the specific, location-selective and time-stable modification of the surface of a solid in the nanometer range without destruction of the atomic order of the surface at the location of the structure or in its vicinity, which comprises causing a local delamination of at least one layer of the surface having a layered structure through the action of a local probe which exerts an attractive force which is limited spatially and in time onto the surface, forming a time-stable, local elevation with a lateral elongation in the nanometer range.

BRIEF DESCRIPTION OF THE DRAWINGS

FIG. 1 depicts the surface of a layer semiconductor, with (A) showing the surface as it exists initially, (B) showing a local probe in proximity to and acting upon the surface, and (C) showing the resultant deformation.

DESCRIPTION OF THE PREFERRED EMBODIMENTS

Figure 2:
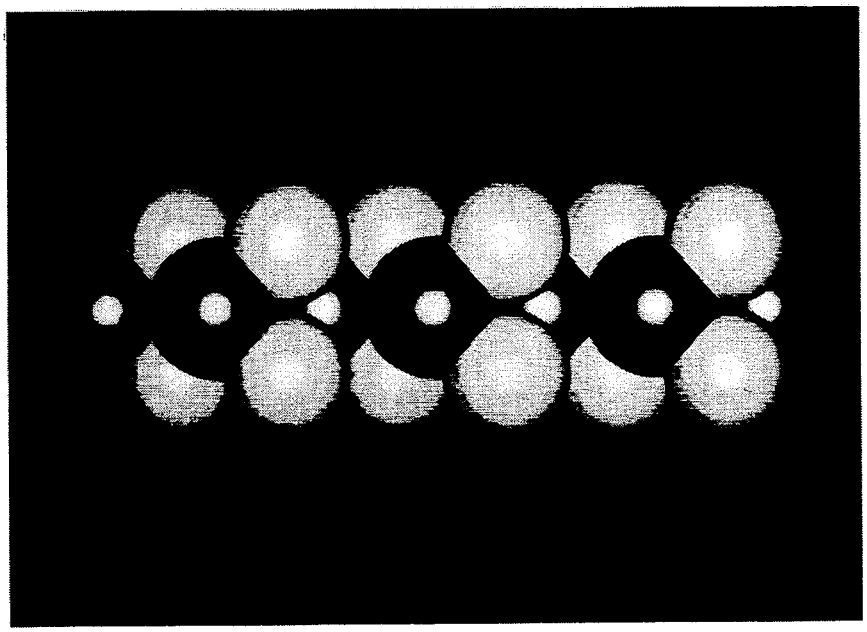
FIG. 2 depicts the three layers of selenium—tungsten—selenium.

In a particular embodiment of the process according to the invention, the local probe, for example the tip of a scanning tunneling microscope, approaches the surface of a layer semiconductor and generates an attractive force between the surface of the sample and the probe electrostatically, magnetically, through adhesion forces or through capillary forces. The process is outlined diagrammatically in FIG. 1. FIG. 1A shows a cross-section through a sample of a layered material. Individual lines show the layers, and the atomic or molecular positions are indicated as small circles. FIG. 1B shows a local probe, which is moved toward the surface of the solid to within a small distance, preferably down to a few atomic diameters or, in order to utilize adhesive forces, even to contact. The double arrow indicates the attractive interaction between the probe and the surface. If the probe is now withdrawn somewhat from the sample while this force is acting, the sample surface follows the probe locally. Whereas only an elastic deformation of the surface is obtained for relatively small forces, delamination occurs if the attractive interaction between the probe and the surface is sufficiently strong, as illustrated in FIG. 1C. The uppermost layer or layers of the material are delaminated locally from the underlying layers, and a local elevation of the sample surface is formed. The prerequisite for this process is that a material having a layered structure, e.g. graphite or a dichalcogenide, for example tungsten diselenide or molybdenum disulfide, is used, it being necessary for the surface used for this process to extend parallel to the layer planes of the material. The process utilizes the fact that the bonding, and thus the cohesion, of the atoms or molecules in the layer is significantly stronger than that between the individual layers. It is thus possible locally to delaminate different layers from one another through relatively weak external forces, while the atoms or molecules within the individual layers still cohere without microscopic defects, bond breaking, dislocations or cracks forming within the individual layers. In this way, the atomic or molecular order within the layers is fully retained and the atomic or molecular lattice is merely slightly distorted, but not destroyed, locally at the surface. An essential prerequisite for erasability of these structures produced by delamination is thus satisfied.

In a preferred embodiment, the process according to the invention is advantageously carried out using a tunneling microscope whose tunneling tip functions as the local probe. STM allows, in particular, the surface to be imaged before and after the modification (in most cases at atomic resolution) using the same probe as also used for the surface modification.

The process according to the invention also has the advantage that cooling is unnecessary. The structures obtained were fully stable over the observation time of up to two days and were also unmodified by frequently repeated imaging processes using a scanning probe microscope. By contrast, the structures produced can be erased again by specific and defined warming through thermally activated relaxation to the unmodified initial state.

The process according to the invention is thus suitable in a particularly advantageous manner for the storage and erasure of information units. Each structure produced will correspond to an information content of 1 bit. It is advantageous that the same probe can be used for writing and for reading the written information and for erasure thereof, i.e. the probe is a read/write head, and that the speed of the writing process is limited only by the positioning speed of the piezo system and by the time constant of the tunneling cycle. Writing speeds in the region of a few milliseconds for writing 1 bit can be achieved using conventional equipment, and in the region of microseconds by means of a slight modification to the electronics.

Figure 3:
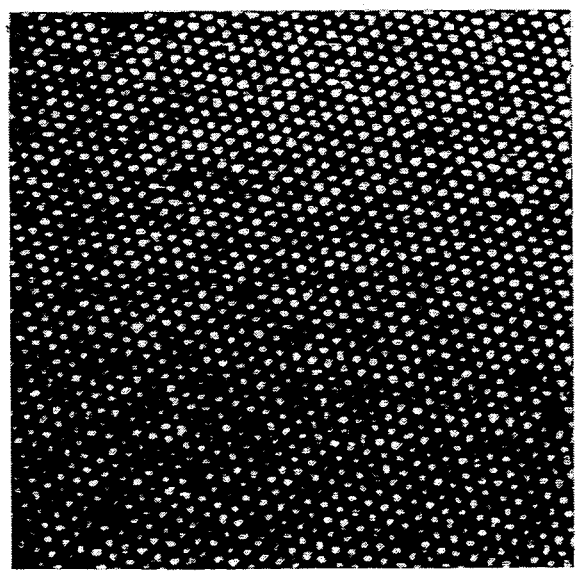
FIG. 3 is a scanning tunneling microscope image of the surface before deformation.

The process according to the invention is described below in illustrative terms:

A tungsten diselenide sample grown by the gas-phase transport method was first cleaved parallel to its cleavage direction, giving a clean, new surface running parallel to the layer planes of the material. Each of these layers comprises three individual layers in the sequence selenium—tungsten—selenium, as shown in FIG. 2. The green spheres correspond to the positions of the selenium atoms, and the red to those of the tungsten atoms. The thus-prepared surface of the tungsten diselenide sample was first imaged at atomic resolution using a scanning tunneling microscope (FIG. 3). The tunneling voltage over the sample surface was 0.8V (tunneling tip positive), and the tunneling current was 3 nA. The interatomic distance in FIG. 3 is 0.33 nm.

Figure 4:
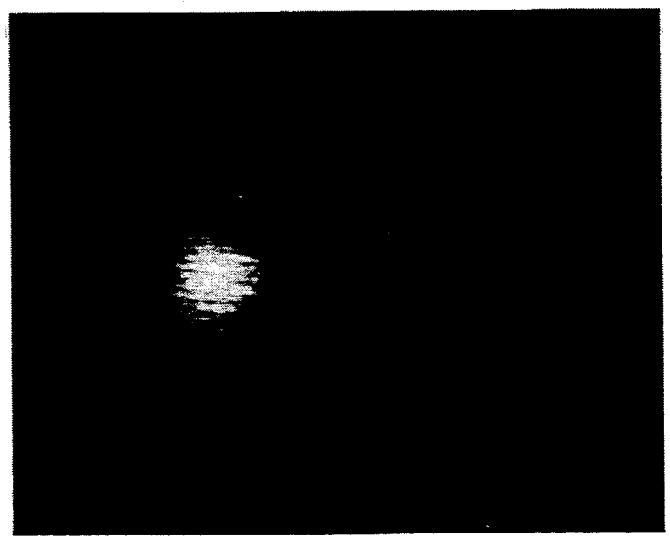
FIG. 4 is a similar image after deformation.

The tunneling tip was subsequently positioned on the sample at the desired point to be modified and held in the tunneling region by means of the abovementioned tunneling parameters. A voltage of the same polarity as the tunneling voltage, in the form of a sinusoidal half wave having an amplitude of 3.2 volts and a pulse duration of between 2 ms and 20 ms, was then applied between the tunneling tip and the sample. The control circuit of the tunneling microscope remained active during the entire process and, as a result of the increase in the tunneling current due to the pulse, caused the tunneling tip to withdraw at the time constant of the control circuit when the pulse voltage was applied. The increased attractive electrostatic interaction between the tip and the sample during the pulses caused a local delamination, evident as smooth, round bumps on the originally completely flat surface, at each of the points at which the pulses were applied. FIG. 4 shows two delamination bumps of this type, having diameters of about 3 nm, produced by two voltage pulses at the corresponding points with simultaneous withdrawal of the tip from the sample surface at the command of the control circuit. The structures were imaged using the same tunneling tip used for their production and previously used to image the unmodified surface. FIG. 4 shows, at atomic resolution, that the atomic order of the surface is also retained after the modification in the modified region and in the vicinity thereof.

The structures shown were produced at room temperature and in air and proved to be time-stable under these conditions for days. It was also possible to show that writing of the structures is also possible in an ultra-high vacuum and the structures are also stable under these conditions.

For applications as an information store, it is essential that the reading operation does not modify the stored information. To this end, delamination structures of this type were produced on various samples and scanned for several hours using the STM immediately after their production and after a longer waiting time (about 20 hours) so that one and the same structure was imaged up to 5,000 times. In no case was any change in the structures observable.

Experiments on surfaces covered with delamination structures showed that such structures on tungsten diselenide relax again on heating at 600° C. for about 40 minutes, and it is possible to restore the original flat sample surface.

We claim:

1. A process for the specific, location-selective and time-stable modification of the surface of a solid in the nanometer range without destruction of the atomic order of the surface at the location of the structure or in its vicinity, which comprises causing a local delamination of at least one layer of the surface having a layered structure through the action of a local probe which exerts an attractive force, which is limited spatially and in time, onto the surface, forming a time-stable, local elevation with a lateral elongation in the nanometer range.

2. A process as claimed in claim 1, wherein the local probe employed is a surface-sensitive scanning probe.

3. A process as claimed in claim 1, wherein the surface of the solid is imaged before and after the modification using the same surface-sensitive scanning probe which was used to cause the surface modifications.

4. A process as claimed in claim 1, wherein the solid having a layered structure is graphite or a metal dichalcogenide.

5. A process as claimed in claim 1, wherein the attractive force used is an attractive electrostatic interaction generated by applying a voltage pulse between the local probe and the surface of the solid.

6. A process as claimed in claim 1, wherein the attractive force used is a magnetic interaction between a magnetic local probe and the surface of the solid.

7. A process as claimed in claim 1, wherein the attractive force used is the adhesive force between the tip and the sample which becomes effective on contact of the local probe and the surface of the solid and causes the local delamination on subsequent removal of the probe from the surface.

8. A process as claimed in claim 1, wherein the attractive force used is the van der Waals force between the tip and the sample which becomes effective on contact of the local probe and the surface of the solid and causes the local delamination on subsequent removal of the probe from the surface.

9. A process as claimed in claim 1, wherein a liquid is located between the local probe and the surface of the solid and causes the local delamination due to capillary forces on withdrawal of the probe.

10. A process for erasing delamination structures generated as claimed in claim 1 by thermal treatment of the surface of the solid.

* * * * *